(12) United States Patent
Walter

(10) Patent No.: US 9,719,431 B2
(45) Date of Patent: Aug. 1, 2017

(54) AVOIDANCE OF A SAFETY FUEL CUT-OFF DURING PARTIAL ENGINE OPERATION

(71) Applicant: Robert Bosch GmbH, Stuttgart (DE)

(72) Inventor: Frank Walter, Ilsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 630 days.

(21) Appl. No.: 14/252,989

(22) Filed: Apr. 15, 2014

(65) Prior Publication Data

US 2014/0366835 A1    Dec. 18, 2014

(30) Foreign Application Priority Data

Jun. 13, 2013    (DE) .................. 10 2013 211 003

(51) Int. Cl.
| F02D 17/02 | (2006.01) |
| F02D 41/00 | (2006.01) |
| F02D 41/22 | (2006.01) |

(52) U.S. Cl.
CPC ......... *F02D 17/02* (2013.01); *F02D 41/0087* (2013.01); *F02D 41/22* (2013.01); *F02D 2041/0012* (2013.01); *F02D 2041/227* (2013.01); *Y02T 10/40* (2013.01)

(58) Field of Classification Search
CPC ...... F02D 17/02; F02D 41/22; F02D 41/0087; F02D 2041/0012; F02D 2041/227; Y02T 10/40
USPC .......... 701/101–105, 107, 112; 123/198 DB, 123/481, 359
See application file for complete search history.

(56) References Cited

U.S. PATENT DOCUMENTS

| 4,653,445 A | * | 3/1987 | Book | ...................... F02D 17/04 123/198 D |
| 5,492,100 A | * | 2/1996 | Ishii | ....................... F02D 13/06 123/481 |
| 5,715,786 A | * | 2/1998 | Seiberth | ............... F02B 77/088 123/198 D |
| 6,457,466 B1 | * | 10/2002 | Ritter | ....................... F01N 3/02 123/198 D |
| 6,843,229 B2 | | 1/2005 | Bauerle et al. | |
| 6,874,463 B1 | * | 4/2005 | Bolander | .............. F02D 11/105 123/198 F |
| 7,044,101 B1 | * | 5/2006 | Duty | ...................... F02D 17/02 123/198 F |
| 7,195,001 B1 | * | 3/2007 | Pallett | ..................... F02D 13/06 123/198 F |

(Continued)

FOREIGN PATENT DOCUMENTS

| DE | 10 2009 046 097 A1 | 5/2011 |
| FR | 2 755 185 A1 | 4/1998 |
| FR | 2 945 324 A3 | 11/2010 |

*Primary Examiner* — Sizo Vilakazi
*Assistant Examiner* — Brian Kirby
(74) *Attorney, Agent, or Firm* — Norton Rose Fulbright US LLP; Gerard Messina

(57) ABSTRACT

A method for operating an internal combustion engine that includes at least two cylinders, includes operating the internal combustion engine in a first operating mode in partial engine operation, in which at least one of the cylinders is not fired, monitoring the internal combustion engine during the partial engine operation for potentially torque-increasing errors, and switching over from the partial engine operation into a full engine operation in which all of the cylinders are fired when a potentially torque-increasing error is detected.

12 Claims, 2 Drawing Sheets

(56) References Cited

U.S. PATENT DOCUMENTS

| | | | |
|---|---|---|---|
| 7,225,801 B2 * | 6/2007 | Pallett | F02D 17/02 123/688 |
| 7,231,907 B2 * | 6/2007 | Bolander | F02D 13/06 123/198 F |
| 7,577,512 B2 | 8/2009 | Herz et al. | |
| 7,593,806 B2 | 9/2009 | Whitney | |
| 7,844,390 B2 * | 11/2010 | Suzuki | F02D 17/02 701/112 |
| 8,103,433 B2 * | 1/2012 | Hartmann | F02D 17/02 123/198 F |
| 8,205,599 B2 | 6/2012 | Mc Donald et al. | |
| 8,297,258 B2 * | 10/2012 | Rosenberger | F02D 17/02 123/443 |
| 8,751,135 B2 * | 6/2014 | Girotto | F02D 41/123 123/198 DB |
| 9,068,524 B2 * | 6/2015 | Malik | F02D 41/0085 |
| 2004/0221832 A1 * | 11/2004 | Takahashi | F02D 41/0087 123/339.15 |
| 2004/0226539 A1 * | 11/2004 | Takahashi | F02D 17/02 123/406.33 |
| 2004/0255905 A1 | 12/2004 | Bauerle et al. | |
| 2007/0144490 A1 * | 6/2007 | Serra | F02D 41/3872 123/458 |
| 2008/0092850 A1 * | 4/2008 | Feinleib | F02M 57/025 123/445 |
| 2008/0133107 A1 | 6/2008 | Herz et al. | |
| 2009/0118985 A1 | 5/2009 | Whitney | |
| 2009/0158833 A1 * | 6/2009 | Kusatsugu | F02D 41/0087 73/114.45 |
| 2009/0198439 A1 * | 8/2009 | Ochiai | B60K 6/365 701/112 |
| 2009/0250038 A1 * | 10/2009 | Xu | F02D 41/22 123/457 |
| 2009/0259382 A1 * | 10/2009 | McKay | F02D 41/0085 701/102 |
| 2011/0079205 A1 * | 4/2011 | Rosenberger | F02D 17/02 123/672 |
| 2011/0126801 A1 * | 6/2011 | Walter | F02D 13/06 123/406.2 |
| 2011/0153145 A1 * | 6/2011 | Kettenacker | B60W 50/04 701/31.4 |
| 2011/0168131 A1 | 7/2011 | Mc Donald et al. | |
| 2011/0213540 A1 * | 9/2011 | Tripathi | F02D 37/02 701/102 |
| 2012/0080010 A1 * | 4/2012 | Nistler | F02D 41/3863 123/456 |

* cited by examiner

AVOIDANCE OF A SAFETY FUEL CUT-OFF DURING PARTIAL ENGINE OPERATION

FIELD OF THE INVENTION

The present invention relates to a method for operating an internal combustion engine that includes at least two cylinders.

BACKGROUND

During operation of vehicles that include multi-cylinder internal combustion engines, operating conditions or driving situations exist in which the required power may be provided by less than all of the cylinders. For that reason, individual cylinders or cylinder groups may be deactivated in such operating conditions for increasing efficiency. The deactivation of one or multiple cylinders makes it possible to operate the cylinder or cylinders, which continue to be active, at increased power and better efficiency. The operation using only a portion of the cylinders is also denoted as partial engine operation, and the term "partial engine operating phases" will be used in the following for operating phases of an internal combustion engine of this type. Usually, half of the cylinders are shut off, which is denoted as half-engine operation (HMB). If all cylinders are active, this is the so-called full engine operation (VMB).

The engine controls of modern vehicles are equipped with so-called E-GAS systems (electronic accelerator pedal). In this case, there is no longer a mechanical connection between the accelerator pedal and the engine actuator, such as the throttle valve in gasoline engines or the control lever in diesel engines, but instead the engine actuators are activated electronically. For safety reasons, so-called E-GAS monitoring is implemented in this case, which detects potentially torque-increasing errors, and then transitions the vehicle into a safe operating condition.

The safe operating condition is usually characterized by a so-called safety fuel cut-off (SKA), which ordinarily takes effect at a limiting speed (of, for example, 1500 $RPM^{-1}$), and a reduced fuel metering below the limiting speed.

If the internal combustion engine is operated in partial engine operation, the potentially torque-increasing errors, which must be monitored, include whether the unneeded cylinders are shut off. This may be accomplished by checking the ignition and injection suppression mask for the pattern typical for the cylinder shutoff. If a torque-increasing error is detected in this case, the E-GAS monitoring responds and activates the safety fuel cut-off.

SUMMARY

However, the triggering of the safety fuel cut-off represents a great limitation of vehicle operation. The engine's throttle response is reserved and it is only possible to achieve low speeds.

It is therefore desirable to trigger the safety fuel cut-off as rarely as possible.

The present invention presents a possibility for triggering the safety fuel cut-off only as rarely as possible, in that in the case of an occurrence of a potentially torque-increasing error during a partial engine operation, the internal combustion engine is initially brought into full engine operation. In other words, the partial engine operation, which is preferably the half-engine operation, is initially discontinued in the case of an error, before additional safety functions are activated.

Conventionally, a safety fuel cut-off is triggered only when the potentially torque-increasing error occurs for longer than a debounce time, which is denoted here as cut-off debounce time. A typical cut-off debounce time is approximately 500 ms.

Within the scope of the present invention, this time may be used advantageously to discontinue the partial engine operation after the detection of a potentially torque-increasing error and bring the internal combustion engine into full engine operation. Within the scope of the present invention, full engine operation is the first safe operating condition. This is acceptable with regard to safety, since conditions that generate a torque-increasing error during partial engine operation (for example, more cylinders fire than desired or injection is made into more cylinders than desired), are not torque-increasing errors during full engine operation. Thus, switching over into full engine operation makes it possible to avoid a safety fuel cut-off. An error code may be stored, for example, to facilitate the maintenance of the internal combustion engine.

Preferably, a safety fuel cut-off is the second safe operating condition. This is triggered when torque-increasing errors occur during full engine operation and/or when the switch-over from partial engine operation into full engine operation does not occur within the cut-off debounce time. This specific embodiment is also readily implementable, since an error still existing after the cut-off debounce time customarily results in the triggering of the safety fuel cut-off in any case. A later return to partial engine operation may be allowed at any time.

The present invention may thus be integrated into existing control unit software in a particularly simple manner, in that a function is implemented which switches the internal combustion engine into full engine operation still during the cut-off debounce time upon the occurrence of a potentially torque-increasing error. Advantageously, also defined for this function is a debounce time denoted here as switch-over debounce time, which is, however, significantly shorter than the cut-off debounce time, for example, only approximately 100 ms. A switch-over into full engine operation takes place only if the potentially torque-increasing error is detected for longer than the switch-over debounce time.

According to an example embodiment of the present invention, an arithmetic unit, for example, a control unit of a motor vehicle, is, in particular, programmed for implementing a method according to the present invention.

The implementation of the method in the form of software is also advantageous, since it entails very low costs, in particular when an executing control unit is also used for other tasks and is therefore present anyway. Suitable data media for providing the computer program are, in particular, diskettes, hard drives, flash memories, EEPROMs, CD-ROMs, DVDs, etc. A download of a program via computer networks (Internet, Intranet, etc.) is also possible.

The present invention is depicted schematically in the drawings based on an example embodiment, and is described in greater detail below with reference to the drawings. Additional advantages and embodiments of the present invention arise from the description and the accompanying drawings. The features stated above and the features still to be explained below are usable not only in the particular combination specified but also in other combinations or alone without departing from the scope of the present invention.

DETAILED DESCRIPTION

Figure 1:
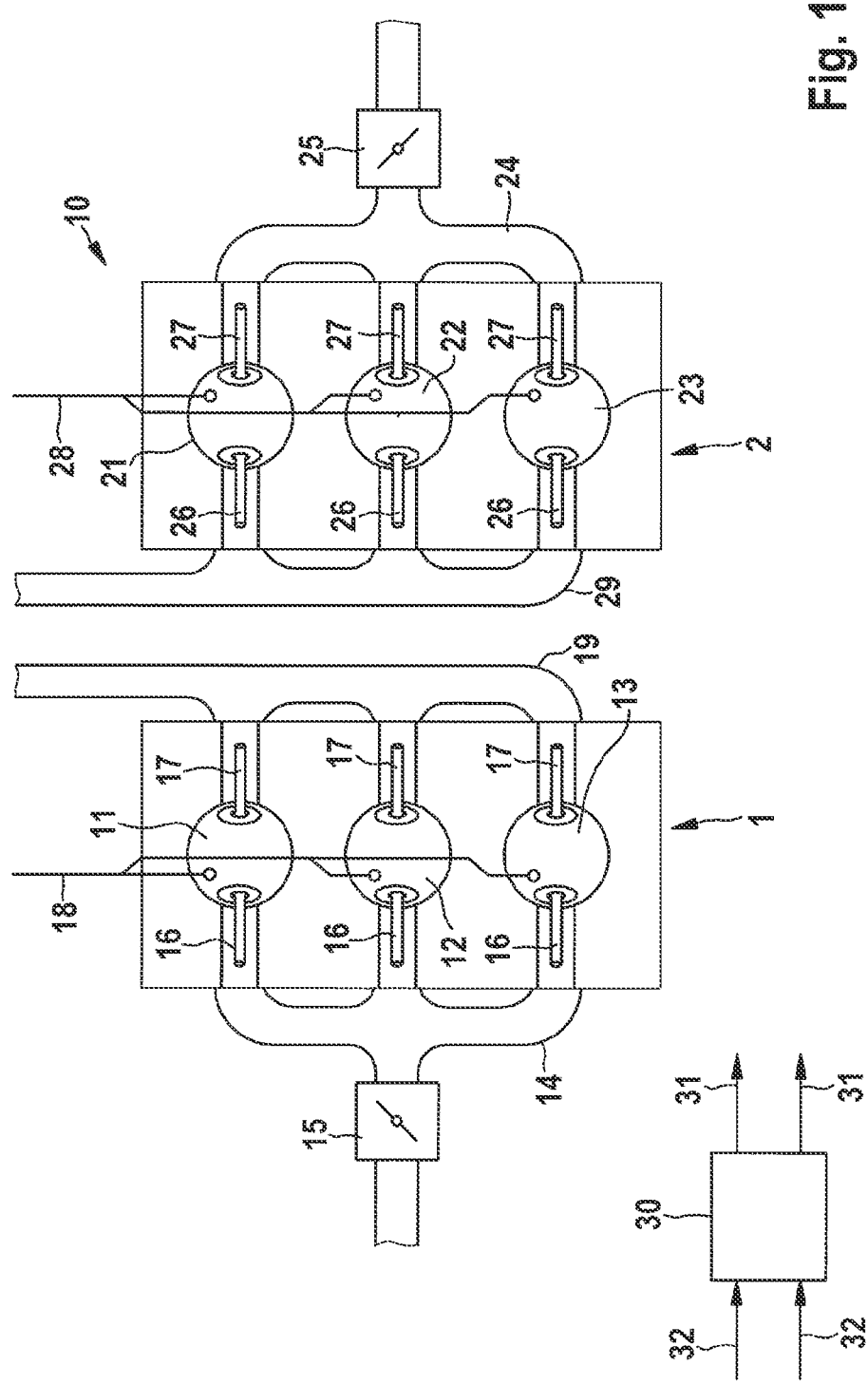
FIG. 1 shows a schematic partial diagram of an internal combustion engine, which may be operated according to the present invention.

FIG. 1 shows an internal combustion engine, for example, of a motor vehicle, in the form of a highly schematic diagram and is generally denoted by reference numeral 10. Internal combustion engine 10 may be operated with the aid of a method according to the present invention.

Internal combustion engine 10 includes two cylinder banks or engine banks 1, 2. Cylinders 11 through 13 (engine bank 1) and 21 through 23 (engine bank 2) are provided in each of engine banks 1, 2. Intake manifold systems 14 and 24, which are configured for supplying fresh air (combustion air) are assigned to each cylinder bank 1, 2. A throttle valve 15 is provided upstream from intake manifold system 14; a throttle valve 25 is provided upstream from intake manifold system 24. With the aid of throttle valves 15 and 25 it is possible to throttle the fresh air stream used to supply engine banks 1, 2. With the aid of intake valves 16 and 27, fresh air may be admitted into cylinders 11 through 13 (engine bank 1) and cylinders 21 through 23 (engine bank 2). Via exhaust valves 17 and 26, a combusted air-fuel mixture or uncombusted fresh air (in the case of deactivated cylinders) may be expelled from cylinders 11 through 13 (engine bank 1) and cylinders 21 through 23 (engine bank 2) into corresponding exhaust gas manifolds 19 and 29.

Fuel may be supplied to cylinders 11 through 13 (engine bank 1) and cylinders 21 through 23 (engine bank 2) via fuel lines 18 and 28 assigned to each of engine banks 1 and 2, respectively. During the partial engine operation, a so-called engine bank injection suppression may occur, so that an introduction of fuel into cylinders 11 through 13 (engine bank 1) and 21 through 23 (engine bank 2) is suppressed during the partial engine operation phases by interrupting the injection, i.e., interrupting the supply of fuel to cylinders 11 through 13 (engine bank 1) and 21 through 23 (engine bank 2) via fuel lines 18 and 28. It should be pointed out that other methods for providing a partial engine operation are also suitable, such as switching off the gas exchange valves.

A control unit 30 is provided which is able to influence a position of throttle valves 15 and 25, an injection of fuel into the cylinders and, if necessary, an ignition (in the case of gasoline engines) via signal lines (not shown) with the aid of control signals 31. Control unit 30 is programmed for carrying out a method according to the present invention, and is able for this purpose to detect a function or a condition of the throttle valves and the cylinders, for example, via inputs 32 which are also connected to corresponding sensors at the throttle valves and cylinders via signal lines (also not shown). In particular, an injection of fuel into the cylinder and an ignition of the cylinder may be detected.

Figure 2:
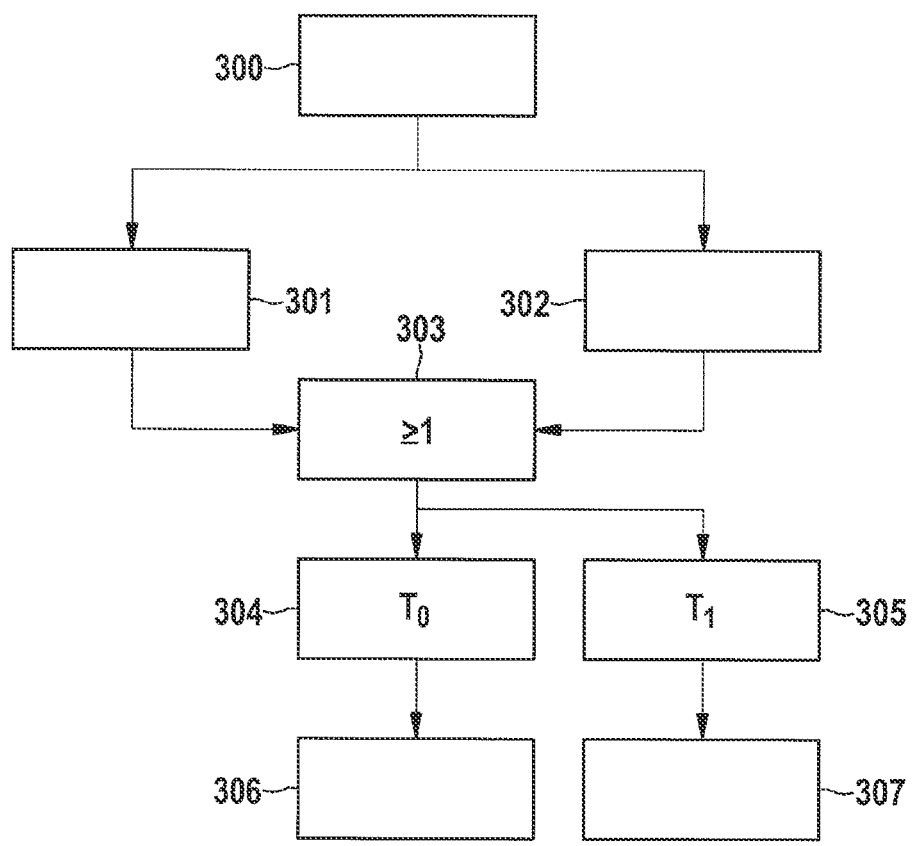
FIG. 2 is a flowchart that shows a sequence of an example embodiment of the method according to the present invention.

A preferred example embodiment of a method according to the present invention is illustrated in FIG. 2.

The method starts at step 300, in which it is checked if all requirements for carrying out the example method according to the present invention have been satisfied. In particular, this includes whether internal combustion engine 10 is operated in partial engine operation. If the requirements for carrying out the method according to the present invention are present, steps 301 and 302 are implemented in parallel. The steps are used to check the partial engine operation for torque-increasing errors.

In step 301, an ignition pattern test is carried out, and in step 302, an injection suppression pattern test is carried out.

During partial engine operation, the changed activation of the actuators is checked using logical variables defined for this purpose. Relevant to this are ignition and injection, since the active spark plugs and injectors change. After a transition phase (of a few, e.g., 10, ms), a fixed pattern results which must be consistent with the intended pattern. If, for example, every second cylinder is to be fired in ignition sequence, the ignition pattern resulting from it and the injection suppression pattern resulting from it must each be in conformity with a certain expected value. In the control unit, this may be implemented by programming in the following manner.

The mask and the expected value are made up of as many digits as the engine has cylinders. According to the ignition sequence, there is a first cylinder which bears the number 0, and a last cylinder which bears the number "number of cylinders of engine –1" (thus 5 in the case of a six-cylinder engine according to FIG. 1). In the software, the least significant bit stands to the right, so that the pattern is advantageously counted from the right as well.

The typical mask for a six cylinder engine during half-engine operation is thus: 101010.

The value "1" means "suppressed." It is apparent that each second cylinder 1, 3, 5 (counted from the right) is suppressed and cylinders 0, 2, 4 are fired.

An error could be, for example, that cylinder 1 was not suppressed. The mask then appears as follows: 101000. This error should be detected. In programming, an "unequal" may be readily used for that purpose. If the test result is unequal to the expected value, an error is present and a corresponding error output is set at 301 and 302.

The error outputs are fed to an OR gate 303, which outputs an error if at least one of the inputs indicates an error.

In the error case, a cut-off debounce time $T_0$ of, for example, 500 ms is activated in step 304, after the end of which the safety fuel cut-off is requested in step 306 if the error continues to be present.

Parallel to this, a switch-over debounce time $T_1$ of, for example, 100 ms is now also activated in step 305, after the end of which the full engine operation is requested in step 307 if the error continues to be present. Simultaneously, this may be displayed to the driver of the motor vehicle and/or an error may be entered into an error memory.

If full engine operation is assumed in good time after the end of switch-over debounce time $T_1$, i.e., before the end of cut-off debounce time $T_0$, the result of this is that the torque-increasing error is no longer present after the end of cut-off debounce time $T_0$ and step 306 is thus not triggered. The safety fuel cut-off is thus avoided.

In order to quickly achieve the full engine operation after the request in step 307, for example, a special bit in the software may be set in the request, which, when present, causes a normally provided switch-over function to immediately interrupt the half-engine operation.

What is claimed is:
1. A method for operating an internal combustion engine that includes at least two cylinders, the method comprising:
  in a first operating mode, operating, by the internal combustion engine, in partial engine operation in which at least one of the at least two cylinders is not fired;
  monitoring, by processing circuitry, the internal combustion engine, during the partial engine operation, for a potentially torque-increasing error; and
  responsive to a detection in the monitoring step of the potentially torque-increasing error:

tracking, by the processing circuitry, an amount of time lapsed from a time of the detection without removal of the potentially torque-increasing error;

responsive to the tracked amount of time exceeding a first threshold time period, executing a control, by the processing circuitry, to switch over operation of the internal combustion engine from the partial engine operation to a full engine operation in which all of the at least two cylinders are fired; and the processing circuitry responding to a case where the switch over has not occurred by a time at which the tracked amount of time exceeds a second threshold time period that is greater than the first threshold time period by executing a control to operate the internal combustion engine with a safety fuel cut-off.

2. The method of claim 1, wherein the potentially torque-increasing error is an injection into the at least one cylinder.

3. The method of claim 2, wherein the monitoring includes checking for an injection into each of the at least two cylinders, generating an actual injection suppression mask based on the checking, and comparing the actual injection suppression mask with an expected injection suppression mask, a deviation detected in the comparing step being a detection of the potentially torque-increasing error.

4. The method of claim 1, wherein the potentially torque-increasing error is an ignition of the at least one cylinder.

5. The method of claim 4, wherein the monitoring includes checking for an ignition in each of the at least two cylinders, generating an actual ignition mask based on the checking, and comparing the actual ignition mask with an expected ignition mask, a deviation detected in the comparing step being a detection of the potentially torque-increasing error.

6. A device for operating an internal combustion engine that includes at least two cylinders, the device comprising:
processing circuitry configured to:
control the internal combustion engine to operate in a first operating mode in partial engine operation in which at least one of the at least two cylinders is not fired;
monitor the internal combustion engine, during the partial engine operation, for a potentially torque-increasing error; and
responsive to a detection in the monitoring step of the potentially torque-increasing error:
track an amount of time lapsed from a time of the detection without removal of the potentially torque-increasing error;
responsive to the tracked amount of time exceeding a first threshold time period, execute a control to switch over operation of the internal combustion engine from the partial engine operation to a full engine operation in which all of the at least two cylinders are fired; and
respond to a case where the switch over has not occurred by a time at which the tracked amount of time exceeds a second threshold time period that is greater than the first threshold time period by executing a control to operate the internal combustion engine with a safety fuel cut-off.

7. The device of claim 6, wherein the potentially torque-increasing error is an injection into the at least one cylinder.

8. The device of claim 7, wherein the monitoring includes checking for an injection into each of the at least two cylinders, generating an actual injection suppression mask based on the checking, and comparing the actual injection suppression mask with an expected injection suppression mask, a deviation detected in the comparing step being a detection of the potentially torque-increasing error.

9. The device of claim 6, wherein the potentially torque-increasing error is an ignition of the at least one cylinder.

10. The device of claim 9, wherein the monitoring includes checking for an ignition in each of the at least two cylinders, generating an actual ignition mask based on the checking, and comparing the actual ignition mask with an expected ignition mask, a deviation detected in the comparing step being a detection of the potentially torque-increasing error.

11. A non-transitory computer-readable medium on which are stored instructions executable by a computer processor, the instructions which, when executed by the processor, cause the processor to perform a method for operating an internal combustion engine that includes at least two cylinders, the method comprising:
controlling the internal combustion engine to operate in a first operating mode in partial engine operation in which at least one of the at least two cylinders is not fired;
monitoring the internal combustion engine, during the partial engine operation, for a potentially torque-increasing error; and
responsive to a detection in the monitoring step of the potentially torque-increasing error:
tracking an amount of time lapsed from a time of the detection without removal of the potentially torque-increasing error;
responsive to the tracked amount of time exceeding a first threshold time period, executing a control to switch over operation of the internal combustion engine from the partial engine operation to a full engine operation in which all of the at least two cylinders are fired; and
responding to a case where the switch over has not occurred by a time at which the tracked amount of time exceeds a second threshold time period that is greater than the first threshold time period by executing a control to operate the internal combustion engine with a safety fuel cut-off.

12. A method for operating an internal combustion engine that includes at least two cylinders, the method comprising:
in a first operating mode, operating, by the internal combustion engine, in partial engine operation in which at least one of the at least two cylinders is not fired;
monitoring, by processing circuitry, the internal combustion engine, during the partial engine operation, for a potentially torque-increasing error; and
responsive to a detection in the monitoring step of the potentially torque-increasing error:
tracking, by the processing circuitry, an amount of time lapsed from a time of the detection;
responsive to the tracked amount of time exceeding a first threshold time period without removal of the potentially torque-increasing error, executing a control, by the processing circuitry, to switch over operation of the internal combustion engine from the partial engine operation to a full engine operation in which all of the at least two cylinders are fired; and
responsive to the tracked amount of time exceeding a second threshold time period without removal of the potentially torque-increasing error, executing a control, by the processing circuitry, to operate the internal combustion engine with a safety fuel cut-off, wherein the second threshold time period is greater than the first threshold time period.

* * * * *